United States Patent
Shen et al.

(10) Patent No.: US 7,885,211 B2
(45) Date of Patent: Feb. 8, 2011

(54) SELECTIVE RANK CQI AND PMI FEEDBACK IN WIRELESS NETWORKS

(75) Inventors: Zukang Shen, Richardson, TX (US); Eko Nugroho Onggosanusi, Allex, TX (US)

(73) Assignee: Texas Instruments Incorporated, Dallas, TX (US)

( * ) Notice: Subject to any disclaimer, the term of this patent is extended or adjusted under 35 U.S.C. 154(b) by 121 days.

(21) Appl. No.: 12/255,307

(22) Filed: Oct. 21, 2008

(65) Prior Publication Data

US 2009/0109873 A1 Apr. 30, 2009

Related U.S. Application Data

(60) Provisional application No. 60/982,947, filed on Oct. 26, 2007.

(51) Int. Cl.
 H04L 12/28 (2006.01)
 H04W 4/00 (2009.01)
 H04B 7/216 (2006.01)

(52) U.S. Cl. ............. 370/278; 370/254; 370/328; 370/335; 455/422; 455/452

(58) Field of Classification Search ......... 370/252–278, 370/328–352; 375/228–260, 267–296; 455/67–90, 455/422–452
See application file for complete search history.

(56) References Cited

U.S. PATENT DOCUMENTS

| | | | |
|---|---|---|---|
| 2008/0233965 A1* | 9/2008 | Kent et al. ............. | 455/450 |
| 2008/0268862 A1* | 10/2008 | Kent et al. ............. | 455/452.2 |
| 2008/0273624 A1* | 11/2008 | Kent et al. ............. | 375/296 |
| 2008/0305745 A1* | 12/2008 | Zhang et al. ........... | 455/67.11 |
| 2009/0017769 A1* | 1/2009 | Chen et al. ............. | 455/69 |
| 2009/0052405 A1* | 2/2009 | Ko et al. ................ | 370/335 |
| 2009/0245169 A1* | 10/2009 | Zhang et al. ........... | 370/328 |
| 2010/0074316 A1* | 3/2010 | Kim et al. .............. | 375/228 |

OTHER PUBLICATIONS

Texas Instruments, "Rank and PMI Feedback Rate—Analysis", 3GPP TSG RAN WG1 50bis, R1-074150, Agenda Item: 6.4.5, Shanghai, China, Oct. 8-12, 2007, pp. 1-7.
3GPP, "3rd Generation Partnership Project; Technical Specification Group Radio Access Network; Evolved Universal Terrestrial Radio Access (E-UTRA); Physical Layer Procedures", Release 8, V8.0.0, Valbonne, France, Sep. 2007, pp. 1-13.
3GPP, "3rd Generation Partnership Project; Technical Specification Group Radio Access Network; Evolved Universal Terrestrial Radio Access (E-UTRA); Physical Layer Procedures", Release 8, V8.4.0, Valbonne, France, Sep. 2008, pp. 1-60.

* cited by examiner

Primary Examiner—M. Phan
(74) Attorney, Agent, or Firm—Robert D. Marshall, Jr.; W. James Brady; Frederick J. Telecky, Jr.

(57) ABSTRACT

Within a wireless network, feedback information is used to determine channel quality. A node in the network receives a configuration message indicating at least a first type of feedback information and a subset S1, wherein S1 is a subset of S0, and wherein the set S0 comprises all possible values of the first type of feedback information. The node selects an element E1 from the set S1 and transmits the selected element E1 in a feedback transmission instance.

12 Claims, 4 Drawing Sheets

SELECTIVE RANK CQI AND PMI FEEDBACK IN WIRELESS NETWORKS

CLAIM OF PRIORITY

This application for Patent claims priority to U.S. Provisional Application No. 60/982,947 entitled "Selective Rank CQI and PMI Feedback" filed Oct. 26, 2007, which is incorporated by reference herein.

FIELD OF THE INVENTION

This invention generally relates to wireless communication, and in particular to providing feedback in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

To support dynamic scheduling and multiple-input multiple-output (MIMO) transmission in downlink (DL), several control information feedback bits must be transmitted in uplink. For example, MIMO related feedback information includes: Index of a selected precoding matrix (PMI); transmission rank, which is the number of spatial transmission layers; and supportable modulation and coding schemes (MCS).

Control information feedback bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACK-NAK or just simply ACK, or any other equivalent term. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS36.211, Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

In this document, the number of information bits for PMI, Rank, and MCS feedback is denoted as $N_{PMI}$, $N_{Rank}$, and $N_{MCS}$, respectively. The set of values represented by the PMI, Rank, and MCS bits is denoted as $S_{PMI}$, $S_{Rank}$, and $S_{MCS}$, respectively. For example, if $N_{PMI}=4$, then $S_{PMI}=\{1, 2, \ldots, 16\}$, representing 16 possible precoding matrix indices.

Typically, the same values of $N_{PMI}$, $N_{Rank}$, and $N_{MCS}$ are used by all UEs in a cell for their feedback. However, for some UEs, it is possible that one or more of the three types of feedback information (i.e. PMI, Rank, or MCS) do not change frequently. Thus, it is unnecessary for those UEs to feedback the stable information bits. In this disclosure, a selective Rank, PMI, and MCS feedback scheme is described that allows a reduction in feedback overhead.

Figure 1:
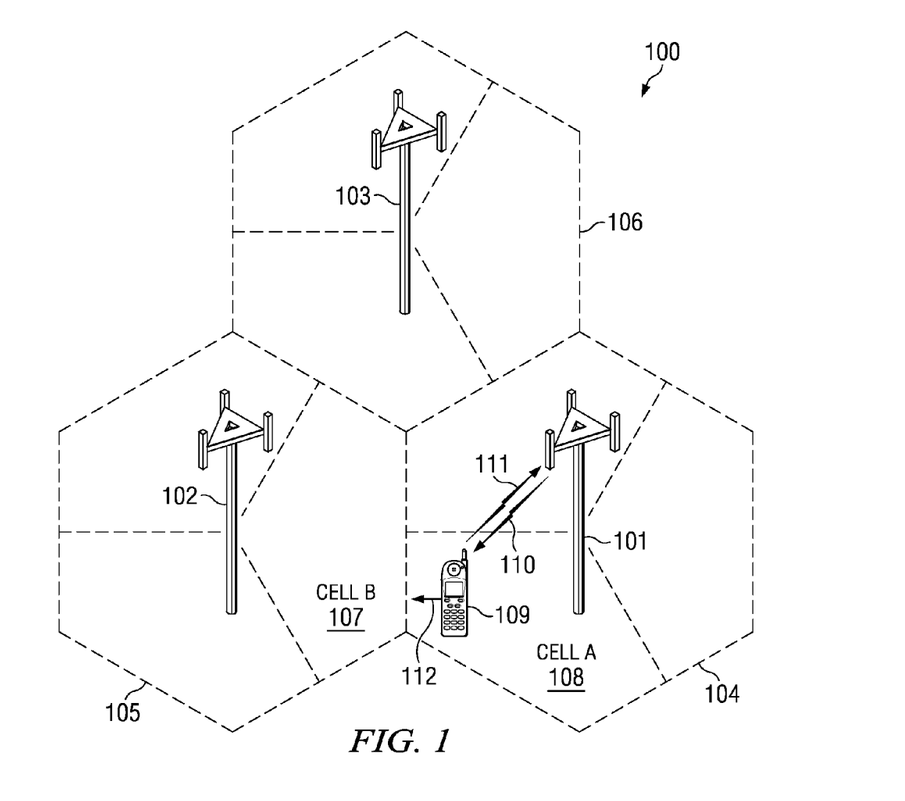
FIG. 1 is a pictorial of an illustrative telecommunications network that employs an embodiment of restricted feedback in the physical uplink control channel (PUCCH)

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

A UE in a cell may be stationary such as within a home or office, or may be moving while a user is walking or riding in a vehicle. UE 109 moves within cell 108 with a velocity 112 relative to base station 102.

Channel quality indicator (CQI) needs to be fed back in uplink (UL) to support dynamic scheduling and multiple-input-multiple-output (MIMO) transmission on downlink (DL). In 3GPP EUTRA, if a UE (user equipment) has no uplink data transmission, its CQI is transmitted on a dedicated UL control channel (i.e. PUCCH). To support dynamic scheduling and multiple-input multiple-output transmission in downlink (DL), several control signaling bits must be fed back in uplink (UL). For example, MIMO related feedback information includes: index of a selected precoding matrix (PMI); transmission rank, which is the number of spatial transmission layers; and supportable modulation and coding schemes (MCS).

In this document, PMI and MCS will generally be referred to as the channel quality indicator (CQI). Note that the feedback frequency and time granularity of MIMO related information can be UE (user equipment) specific. Further, the rank feedback time granularity (reporting interval) can be larger than CQI. Thus, it is unnecessary to transmit rank information every time CQI is fed back. On the other hand, the rank information has to be received with high reliability, because rank information determines the number of information bits contained in CQI. In other words, CQI is generated using the value of transmission rank.

Rank and CQI can be jointly coded and transmitted in UL. However, since rank information determines the length of the CQI information bits and consequently the coding scheme, blind decoding is necessary for joint rank and CQI coding, which may not provide satisfactory performance. In this disclosure, restricted rank and CQI feedback schemes are described. With separate Rank and CQI transmission, one or more OFDM symbols can be exclusively dedicated for Rank transmission. Furthermore, frequency diversity can be easily achieved by repeating the Rank bits on both slots of a subframe. Although the length of the CQI information bits depends on Rank, the joint Rank and CQI transmission scheme may assume the worst (or longest) CQI length, irrespective of the Rank bits. Whenever Rank is decoded erroneously, CQI is incorrectly received. Moreover, for CQI length shorter than the worst case, some coding gains may be lost since the longest CQI length is always assumed.

Note the number of CQI information bits is dependent on Rank. For wideband MIMO related feedback in UL, Table 1 shows exemplary numbers of Rank and CQI bits for joint and separate rank and CQI transmission. For joint transmission, to avoid blind decoding at NodeB, the worst case CQI length needs to be used, irrespective of the Rank value.

TABLE 1

| | Number of Rank and CQI Bits per Subframe | | | |
|---|---|---|---|---|
| | 2-Tx Antennas | | 4-Tx Antennas | |
| | Rank = 1 | Rank = 2 | Rank = 1 | Rank > 1 |
| Separate rank | 1 Rank Bit | 1 Rank Bit | 2 Rank Bits | 2 Rank Bits |
| | 6 CQI Bits | 8 CQI Bits | 8 CQI Bits | 11 CQI Bits |
| Joint, fixed (no blind decoding) | 9 Bits, Rank + CQI | | 13 Bits, Rank + CQI | |

While the preferred rank changes with the short-term channel variation, it changes at a significantly lower rate compared to CQI. A detailed analysis is given in 3GPP R1-074150 "Rank and PMI Feedback Rate—Analysis", October, 2007, incorporated by reference herein, where a difference of ~5× in terms of feedback rate is observed between the rank and CQI reports. The feedback interval for rank report is in the order of 10 ms to 100 ms. This is mainly because the variation in the channel condition number is slower than the variation of the channel coefficients themselves. In addition, the rank report holds for the entire system bandwidth. This motivates a rank feedback separate from CQI. A total range in difference between the rank feedback rate and the CQI feedback rank may be in the order of two to thirty-two times. As discussed above, Thus, it is unnecessary for those UEs to feedback the stable information bits. In this disclosure, a restricted Rank, PMI, and MCS feedback scheme is described that allows a reduction in feedback overhead.

Figure 2:
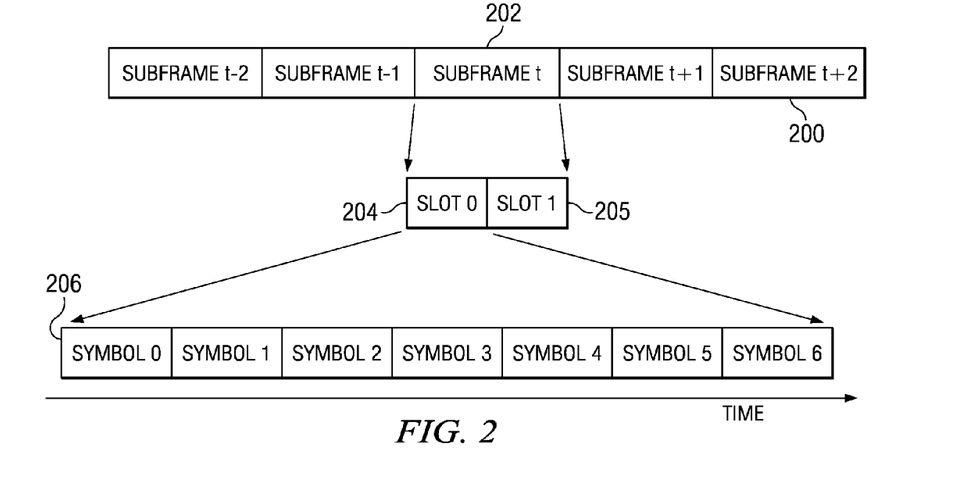
FIG. 2 is an example frame structure used in the PUCCH of FIG. 1.

FIG. 2 is an example frame structure 200 used in the PUCCH of FIG. 1. Each frame 200 contains several subframes, as indicated generally at 202. In turn, subframe 202 contains two slots 204, 205. Each slot contains a number of information carrying symbols, generally indicated at 206. A cyclic prefix (CP) field is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2. With QPSK modulation, 20 coded CQI bits are available per UE within one subframe. Further, with CDM (code division multiplexing) through cyclic shifted CAZAC-like sequences, multiple CQI UEs can be multiplexed on one resource block (RB). Ideally, 12 CQI UEs can be supported within one RB. However, due to spillover between consecutive cyclic shifts, it is recommended that not all 12 cyclic shifts are utilized.

Figure 3A:
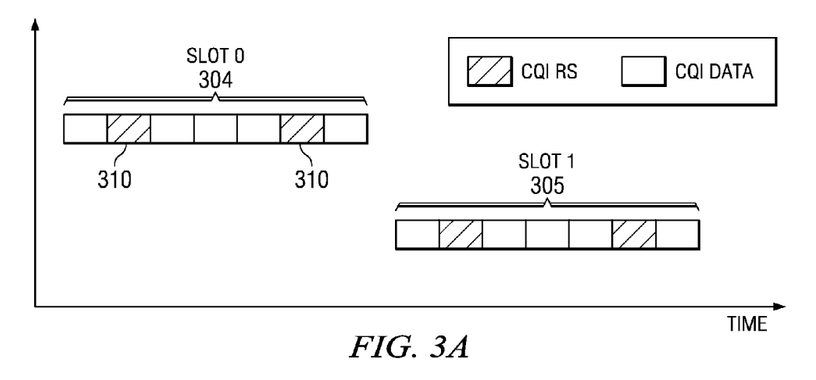
FIGS. 3A and 3B illustrate placement of reference symbols in the frame structure of FIG. 2.
Figure 3B:
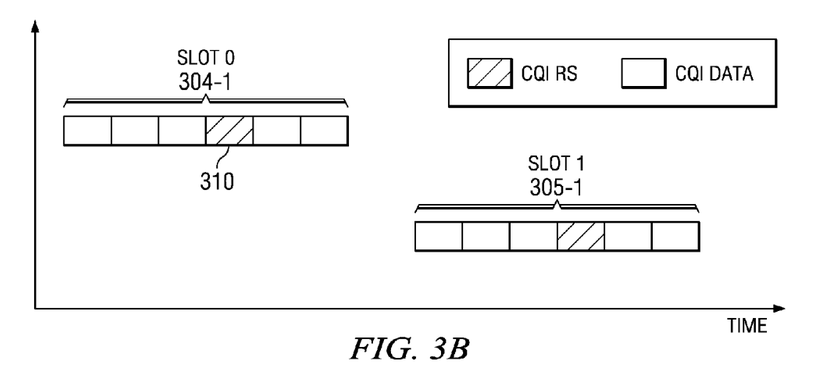

FIGS. 3A and 3B illustrate placement of reference signal symbols 310 in the frame structure of FIG. 2. As discussed above, FIG. 3A illustrates a subframe with two slots 304, 305 in the normal CP case. Two reference symbols (RS) 310 are included within each slot. FIG. 3B illustrates a subframe with two slots 304-1, 305-1 in the extended CP case. In this case, only one reference symbol 310 is included in each slot.

Figure 4:
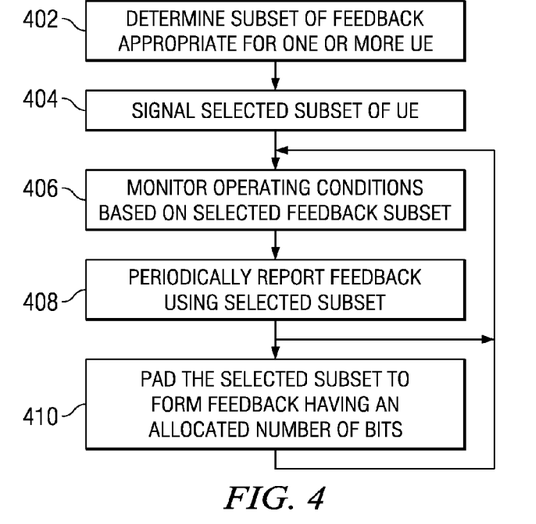
FIG. 4 is a flow diagram illustrating operation restricted feedback in the network of FIG. 1.

FIG. 4 is a flow diagram illustrating operation selective feedback in the network of FIG. 1. Denote $S_{PMI-reduced}$, $S_{Rank-reduced}$, and $S_{MCS-reduced}$ as subset of $S_{PMI}$, $S_{Rank}$, and $S_{MCS}$, respectively. In other words, $S_{PMI-reduced} \subseteq S_{PMI}$, $S_{Rank-reduced} \subseteq S_{Rank}$, and $S_{MCS-reduced} \subseteq S_{MCS}$. Consequently, the number of information bits representing $S_{PMI-reduced}$, $S_{Rank-reduced}$, and $S_{MCS-reduced}$, denoted as $N_{PMI-reduced}$, $N_{Rank-reduced}$, and $N_{MCS-reduced}$, have the following property: $N_{PMI-reduced} \leq N_{PMI}$, $N_{Rank-reduced} \leq N_{Rank}$, and $N_{MCS-reduced} \leq N_{MCS}$. Thus, different UEs can be assigned with different sets of $S_{PMI-reduced}$, $S_{Rank-reduced}$, and $S_{MCS-reduced}$, to reduce its feedback overhead. The NodeB can then determine 402 a subset of feedback that is appropriate for one or more UE within the cell controlled by the NodeB.

Once the information on the reduced set is available at UE, it selects an element from the set and feedback the selected element to eNB. UE may feedback the index of the selected element using $\lceil \log_2 \|S_{reduced}\| \rceil$ bits, wherein $\|S_{reduced}\|$ denotes the number of elements in the reduced set $S_{reduced}$ and $\lceil x \rceil$ represents the ceiling function. Alternatively, UE may feedback the index of the selected element using $\lceil \log_2 \|S\| \rceil$ bits, wherein $\|S\|$ denotes the number of elements in the original (or un-restricted) set.

Note it is not precluded that multiple sets of $S_{PMI-reduced}$, $S_{Rank-reduced}$, and $S_{MCS-reduced}$ exist. The NodeB needs to know the currently employed sets of $S_{PMI-reduced}$, $S_{Rank-reduced}$, and $S_{MCS-reduced}$ by the UE. To that end, NodeB can (explicitly or implicitly) signal 404 to the UE on the sets of $S_{PMI-reduced}$, $S_{Rank-reduced}$, and $S_{MCS-reduced}$. Alternatively, the UE can choose 402 the sets of $S_{PMI-reduced}$, $S_{Rank-reduced}$, and $S_{MCS-reduced}$, and signal 404 (explicitly or implicitly) to the NodeB on its chosen sets of $S_{PMI-reduced}$, $S_{Rank-reduced}$, and $S_{MCS-reduced}$. The sets of $S_{PMI-reduced}$, $S_{Rank-reduced}$, and $S_{MCS-reduced}$ can be UE specific, UE-group specific, or common to all UEs in a cell or system. It is not precluded that the set of $S_{PMI-reduced}$, $S_{Rank-reduced}$, and $S_{MCS-reduced}$ can be adjusted by the NodeB or UE if the UE condition (e.g. location, speed, etc.) changes.

Furthermore, it is not precluded that one or more of $S_{PMI-reduced}$, $S_{Rank-reduced}$, and $S_{MCS-reduced}$ can be an empty set, which means UE does not feedback any information associated with the empty $S_{PMI-reduced}$, $S_{Rank-reduced}$, and/or $S_{MCS-reduced}$. For example, if $S_{PMI-reduced}$ is an empty set for some UE, then the UE only feeds back MCS and Rank.

Moreover, in some case, there is only one element in the sets of $S_{PMI-reduced}$, $S_{Rank-reduced}$, and/or $S_{MCS-reduced}$. For any set of $S_{PMI-reduced}$, $S_{Rank-reduced}$, and $S_{MCS-reduced}$ that contains only one element, no associated feedback is necessary since the NodeB can implicitly derive the feedback information. For example, if $S_{Rank-reduced} = \{1\}$, then Rank feedback is not necessary because there is only one possible Rank if $S_{Rank-reduced} = \{1\}$. On the other hand, the NodeB needs to know $S_{Rank-reduced} = \{1\}$ is currently employed by the UE.

As the UE operates, it monitors 406 operating conditions and channel quality based on the selected feedback subset. Periodically or aperiodically it reports 408 feedback to the NodeB using the selected subset of feedback information. Table 1 lists the required UE feedback based on the cardinality of the sets of $S_{PMI-reduced}$, $S_{Rank-reduced}$, and $S_{MCS-reduced}$. In Table 1, "Non-empty" refers to the case where more than one element exist in the set. In other words, the cardinality of the set is at least 2. "Empty/1-element" refers to the case where the set is either empty or the set contains only one element. No associated feedback is required for any set of category "Empty/1-element".

TABLE 2

Required UE Feedback Information

| $S_{PMI-reduced}$ | $S_{Rank-reduced}$ | $S_{MCS-reduced}$ | UE Feedback Information |
|---|---|---|---|
| Non-empty | Non-empty | Non-empty | PMI, Rank, MCS |
| Empty/1-element | Non-empty | Non-empty | Rank, MCS |
| Non-empty | Empty/1-element | Non-empty | PMI, MCS |
| Non-empty | Non-empty | Empty/1-element | PMI, Rank |
| Non-empty | Empty/1-element | Empty/1-element | PMI |
| Empty/1-element | Non-empty | Empty/1-element | Rank |
| Empty/1-element | Empty/1-element | Non-empty | MCS |

It is not precluded that only some of the cases listed in Table 1 are used. For example, low speed UEs feedback MCS, Rank, and PMI, while high speed UEs only feedback MCS and Rank. Moreover, if the Rank information for some high speed UE is a fixed value (for example, Rank=1), then the Rank feedback is unnecessary since the NodeB can implicitly derive it. This corresponds to the case of $S_{Rank-reduced}$ only contains one element.

In some situations, it is preferable to transmit the worst case number of feedback bits, even if the feedback is restricted, as discussed above. In this case, the selected subset is padded 410 by adding additional bits to form a feedback that has the allocated worst case number of bits. In another embodiment, the padding may form a feedback that has more than the restricted number of bits, but fewer than the worst case number of bits. The padded bits may have a selected fixed value, or may repeat one or more of the bits in the restricted set of feedback bits, for example.

System Examples

Figure 5:
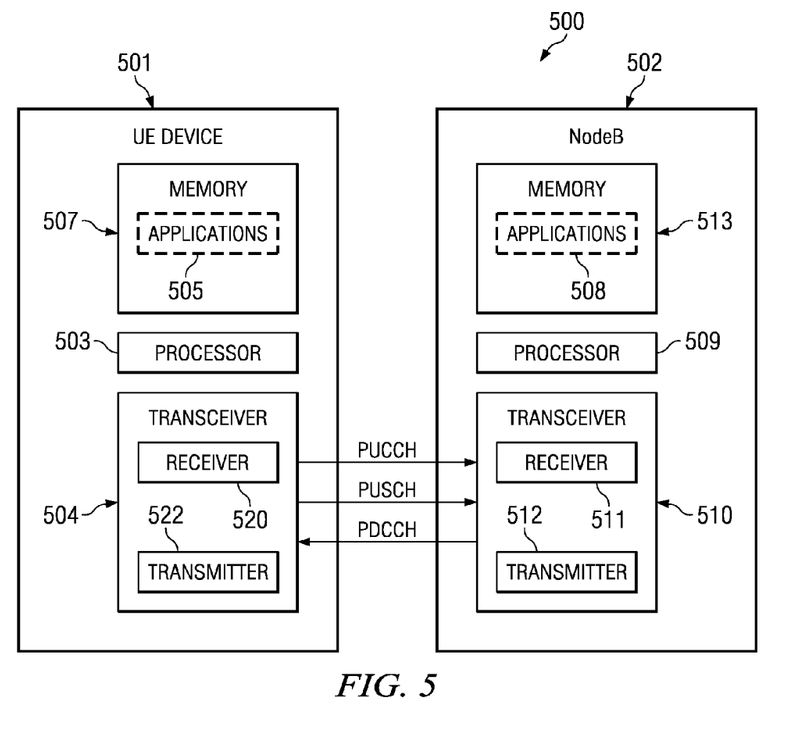
FIG. 5 is a block diagram of a Node B and a User Equipment for use in the network system of FIG. 1.

FIG. 5 is a block diagram illustrating operation of a NodeB and a mobile UE in the network system of FIG. 1. As shown in FIG. 5, wireless networking system 500 comprises a mobile UE device 501 in communication with NodeB 502. The mobile UE device 501 may represent any of a variety of devices such as a server, a desktop computer, a laptop computer, a cellular phone, a Personal Digital Assistant (PDA), a smart phone or other electronic devices. In some embodiments, the electronic mobile UE device 501 communicates with the NodeB 502 based on a LTE or E-UTRAN protocol. Alternatively, another communication protocol now known or later developed can be used.

As shown, the mobile UE device 501 comprises a processor 503 coupled to a memory 507 and a Transceiver 504. The memory 507 stores (software) applications 505 for execution by the processor 503. The applications 505 could comprise any known or future application useful for individuals or organizations. As an example, such applications 505 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 505, at least some of the applications 505 may direct the mobile UE device 501 to transmit UL signals to the NodeB (base-station) 502 periodically or continuously via the transceiver 504. In at least some embodiments, the mobile UE device 501 identifies a Quality of Service (QoS) requirement when requesting an uplink resource from the NodeB 502. In some cases, the QoS requirement may be implicitly derived by the NodeB 502 from the type of traffic supported by the mobile UE device 501. As an example, VOIP and gaming applications often involve low-latency uplink (UL) transmissions while High Throughput (HTP)/Hypertext Transmission Protocol (HTTP) traffic can involve high-latency uplink transmissions.

Transceiver 504 includes uplink logic which may be implemented by execution of instructions that control the operation of the transceiver. Some of these instructions may be stored in memory 507 and executed when needed. As would be understood by one of skill in the art, the components of the Uplink Logic may involve the physical (PHY) layer and/or the Media Access Control (MAC) layer of the transceiver 504. Transceiver 504 includes one or more receivers 520 and one or more transmitters 522 for MIMO operation, as described above. The transmitter is configured to optionally provide restricted feedback to the NodeB as described in more detail above. In particular, as described above, a transmission signal comprises at least one data symbol and at least one RS symbol. An exemplary transmission signal comprising five data symbols and two RS symbols is shown in FIG. 2. Rank indicator and CQI feedback information are embedded, as described above. The restricted feedback may be signaled using a worst case number of bits by padding the restricted subset, as described above. Alternatively, the restricted feedback may be signaled using an amount of feedback bits according to the restricted subset. A particular subset of feedback and signaling scheme may be used when instructed by the NodeB via receiver 520.

A pre-defined reference signal is transmitted in the RS symbol. The pre-defined reference signal transmitted in each RS symbol can be the same. Alternatively, the pre-defined reference signals can be different in different RS symbols, provided these pre-defined reference signals are known to both the transmitter and the receiver.

As shown in FIG. 5, the NodeB 502 comprises a Processor 509 coupled to a memory 513 and a transceiver 510. The memory 513 stores applications 508 for execution by the processor 509. The applications 508 could comprise any known or future application useful for managing wireless communications. At least some of the applications 508 may direct the base-station to manage transmissions to or from the user device 501.

Transceiver 510 comprises an uplink Resource Manager, which enables the NodeB 502 to selectively allocate uplink PUSCH resources to the user device 501. As would be understood by one of skill in the art, the components of the uplink resource manager may involve the physical (PHY) layer and/or the Media Access Control (MAC) layer of the transceiver 510. Transceiver 510 includes a Receiver 511 for receiving transmissions from various UE within range of the NodeB and transmitters 512 for transmitting data and control information to the various UE within range of the NodeB.

The uplink resource manager executes instructions that control the operation of transceiver 510. Some of these instructions may be located in memory 513 and executed when needed on processor 509. The resource manager controls the transmission resources allocated to each UE that is being served by NodeB 502 and broadcasts control information via the physical downlink control channel PDCCH. NodeB 502 needs to know the currently employed sets of $S_{PMI-reduced}$, $S_{Rank-reduced}$, and $S_{MCS-reduced}$ by the UE. To that end, NodeB can (explicitly or implicitly) signal to the UE using the physical downlink control channel (PDCCH) on the sets of $S_{PMI-reduced}$, $S_{Rank-reduced}$, and $S_{MCS-reduced}$. Alternatively, the UE can choose the sets of $S_{PMI-reduced}$, $S_{Rank-reduced}$, and $S_{MCS-reduced}$, and signal (explicitly or implicitly) to the NodeB on its chosen sets of $S_{PMI-reduced}$, $S_{Rank-reduced}$, and $S_{MCS-reduced}$. The sets of $S_{PMI-reduced}$, $S_{Rank-reduced}$, and $S_{MCS-reduced}$ can be UE specific, UE-group specific, or common to all UEs in a cell or system. It is not precluded that the set of $S_{PMI-reduced}$, $S_{Rank-reduced}$, and $S_{MCS-reduced}$ can be adjusted by the NodeB or UE if the UE condition (e.g. location, speed, etc.) changes.

Figure 6:
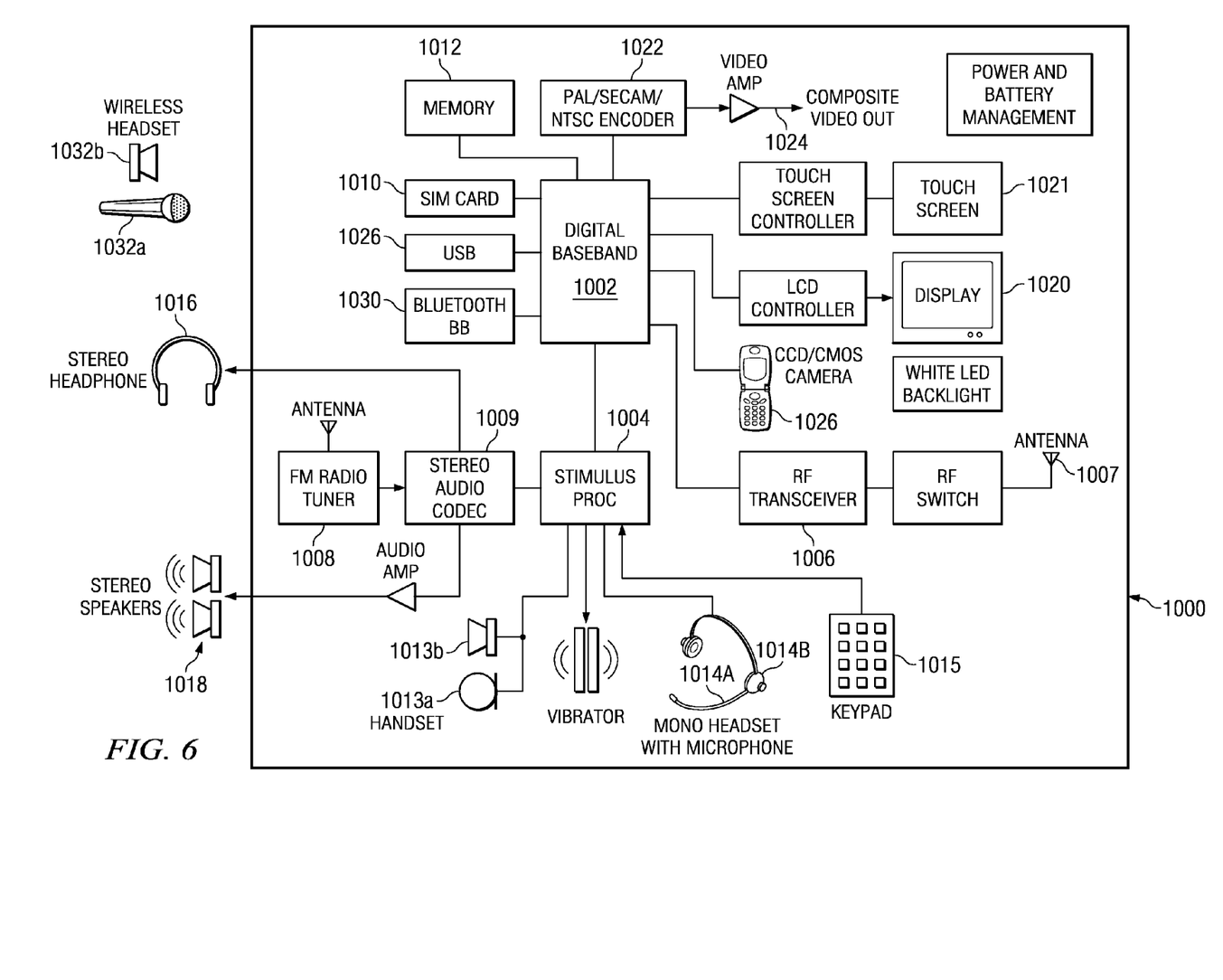
FIG. 6 is a block diagram of a cellular phone for use in the network of FIG. 1.

FIG. 6 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via multiple antennas 1007 that support MIMO operation. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For feedback transmission, a transmitter(s) within transceiver 1006 may be configured to provide restricted feedback as described with respect to FIGS. 2-4. In particular, as described above, for the transmission of feedback a transmission signal may comprise at least one data symbol and at least one RS symbol. An exemplary transmission signal comprising five data symbols and two RS symbols is shown in FIG. 2.

Rank indicator and CQI feedback information are embedded, as described above. The restricted feedback may be signaled using a worst case number of bits by padding the restricted subset, as described above. Alternatively, the restricted feedback may be signaled using an amount of feedback bits according to the restricted subset. A particular subset of feedback and signaling scheme may be used when instructed by a controlling NodeB.

A pre-defined reference signal is transmitted in the RS symbol. The pre-defined reference signal transmitted in each RS symbol can be the same. Alternatively, the pre-defined reference signals can be different in different RS symbols, provided these pre-defined reference signals are known to both the transmitter and the receiver.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

Other Embodiments

Various other embodiments of the invention will be apparent to persons skilled in the art upon reference to this description. For example, a larger or smaller number of symbols then described herein may be used in a slot. Other types of feedback may be separately embedded and transmitted in configured frames at various times. The term "frame" and "subframe" are not restricted to the structure of FIG. 2. Other configurations of frames and/or subframes may be embodied. In general, the term "frame" may refer to a set of one or more subframes. A transmission instance likewise refers to a frame, subframe, or other agreed upon quantity of transmission resource in which a feedback indication can be embedded.

While the disclosure has discussed a restricted Rank, PMI, and MCS feedback scheme that allows a reduction in feedback overhead, other embodiments may use the principles described herein to reduce overhead for signaling other types of information that is routinely signaled between nodes in a network that have an aspect of dynamic variability in required accuracy.

As used herein, the terms "applied," "coupled," "connected," and "connection" mean electrically connected, including where additional elements may be in the electrical connection path. "Associated" means a controlling relationship, such as a memory resource that is controlled by an associated port. While the invention has been described with reference to illustrative embodiments, this description is not intended to be construed in a limiting sense.

It is therefore contemplated that the appended claims will cover any such modifications of the embodiments as fall within the true scope and spirit of the invention.

What is claimed is:

1. A method for providing feedback information in a wireless network, comprising:
receiving a configuration message indicating at least a first type of feedback information and a subset S1, wherein S1 is a subset of S0, wherein the set S0 comprises all possible values of the first type of feedback information and wherein each element in the set S1 is identifiable by an index;
selecting an element E1 from the set S1; and
feeding back the selected element E1 in a feedback transmission instance wherein feeding back the selected element E1 comprises feeding back an index of the selected element E1 in the set S1 and wherein feeding back the index of the selected element E1 in the set S1 wherein feeding back the index of the selected element E1 in the set S1 further comprises feeding back the index of the selected element E1 in the set S1 using ceil($\log_2$(N1)) bits, wherein N1 is the number of elements in S1.

2. A method for providing feedback information in a wireless network, comprising:
receiving a configuration message indicating at least a first type of feedback information and a subset S1, wherein S1 is a subset of S0, wherein the set S1 comprises all possible values of the first type of feedback information and wherein each element in the set S0 is identifiable by an index;
selecting an element E1 from the set S1; and
feeding back the selected element E1 in a feedback transmission instance wherein feeding back the selected element E1 further comprises feeding back an index of the selected element E1 in the set S0 and wherein feeding back the index of the selected element E1 in the set S0 further comprises feeding back the index of the selected element E1 in the set S0 using ceil($\log_2$(N0)) bits, wherein N0 is the number of element in S0.

3. The method of claim 1, further comprising:
receiving a configuration message indicating a second type of feedback information and a subset T1, wherein T1 is a subset of T0, and wherein the set T0 comprises all possible values of the second type of feedback information;
selecting an element F1 from the set T1; and
feeding back the selected element F1 in a feedback transmission instance.

4. A method for providing feedback information in a wireless network, comprising:
transmitting a configuration message indicating at least a first type of feedback information and a subset S1, wherein S1 is a subset of S0, wherein the set S0 comprises all possible values of the first type of feedback information and wherein each element in the set S1 is identifiable by an index; and
receiving feedback of a selected element E1 in a feedback transmission instance, wherein the element E1 was selected from the set S1, wherein receiving feedback comprises receiving an index of the selected element E1 in the set S1 and wherein the received index of the selected element E1 comprises ceil($\log_2$(N1)) bits, wherein N1 is the number of elements in S1.

5. A method for providing feedback information in a wireless network, comprising:
transmitting a configuration message indicating at least a first type of feedback information and a subset S1, wherein S1 is a subset of S0, wherein the set S0 comprises all possible values of the first type of feedback information and wherein each element in the set S0 is identifiable by an index; and receiving feedback of a selected element E1 in a feedback transmission instance, wherein the element E1 was selected from the set S1, wherein receiving feedback comprises receiving an index of the selected element E1 in the set S0 and wherein the received index of the selected element E1 comprises ceil($\log_2$(N0)) bits, wherein N1 is the number of elements in S0.

6. The method of claim 4, further comprising:

transmitting a configuration message indicating a second type of feedback information and a subset T1, wherein T1 is a subset of T0, and wherein the set T0 comprises all possible values of the second type of feedback information; and receiving feedback of a selected element F1 in a feedback transmission instance, wherein the element F1 was selected from the set T1.

7. An apparatus for transmitting in a wireless network, comprising:

processing circuitry coupled to a memory, receiving circuitry and transmission circuitry;

the receiving circuitry being operable to receive a configuration message indicating at least a first type of feedback information and a subset S1, wherein S1 is a subset of S0, wherein the set S0 comprises all possible values of the first type of feedback information, such that the subset S1 is stored in the memory and wherein each element in the set S1 is identifiable by an index;

the processing circuitry being operable to select an element E1 from the set S1; and the transmitting circuitry being operable to feed back the selected element E1 in a feedback transmission instance, wherein feeding back the selected element E1 comprises feeding back an index of the selected element E1 in the set S1 and wherein feeding back the index of the selected element E1 in the set S1 further comprises feeding back the index of the selected element E1 in the set S1 using ceil($\log_2$(N1)) bits, wherein N1 is the number of elements in S1.

8. The apparatus of claim 7, wherein the apparatus is a cell phone, wherein the processing circuitry is operable to decode other received signals and to generate one or more types of feedback information according to the other received signals indicative of channel quality.

9. An apparatus for transmitting in a wireless network, comprising:

processing circuitry coupled to a memory, receiving circuitry and transmission circuitry, wherein the memory contains a subset S1, wherein S1 is a subset of S0, wherein the set S0 comprises all possible values of the first type of feedback information and wherein each element in the set S1 is identifiable by an index;

the transmitting circuitry being operable to transmit a configuration message indicating at least a first type of feedback information and the subset S1; and the receiving circuitry being operable to receive feedback of a selected element E1 in a feedback transmission instance, wherein the element E1 was selected from the set S1, wherein receiving feedback comprises receiving an index of the selected element E1 in the set S1 and wherein the received index of the selected element E1 comprises ceil($\log_2$(N1)) bits, wherein N1 is the number of elements in S1.

10. The apparatus of claim 9, wherein the apparatus forms a base station, the processing circuitry being operable to select between subset S1 for transmitting to a first user equipment (UE) and another subset S2 of S0 for transmitting to a second UE.

11. The method of claim 2, further comprising:

receiving a configuration message indicating a second type of feedback information and a subset T1, wherein T1 is a subset of T0, and wherein the set T0 comprises all possible values of the second type of feedback information;

selecting an element F1 from the set T1; and feeding back the selected element F1 in a feedback transmission instance.

12. The method of claim 5, further comprising transmitting a configuration message indicating a second type of feedback information and a subset T1, wherein T1 is a subset of T0, and wherein the set T0 comprises all possible values of the second type of feedback information; and receiving feedback of a selected element F1 in a feedback transmission instance, wherein the element F1 was selected from the set T1.

* * * * *